(12) United States Patent
Haltiner, Jr. et al.

(10) Patent No.: US 7,037,613 B2
(45) Date of Patent: May 2, 2006

(54) TEMPERATURE ZONES IN A SOLID OXIDE FUEL CELL AUXILIARY POWER UNIT

(75) Inventors: Karl Jacob Haltiner, Jr., Fairport, NY (US); Malcolm James Grieve, Fairport, NY (US); Kevin Richard Keegan, Hilton, NY (US); Michael Thomas Faville, Geneseo, NY (US)

(73) Assignee: Delphi Technologies, Inc., Troy, MI (US)

( * ) Notice: Subject to any disclaimer, the term of this patent is extended or adjusted under 35 U.S.C. 154(b) by 71 days.

(21) Appl. No.: 09/838,356

(22) Filed: Apr. 19, 2001

(65) Prior Publication Data

US 2004/0048120 A1  Mar. 11, 2004

Related U.S. Application Data

(60) Provisional application No. 60/268,328, filed on Feb. 13, 2001, provisional application No. 60/201,568, filed on May 1, 2000.

(51) Int. Cl.
*H01M 8/00* (2006.01)

(52) U.S. Cl. .......................... 429/22; 429/13
(58) Field of Classification Search .................. 429/12, 429/13, 26, 22, 20
See application file for complete search history.

(56) References Cited

U.S. PATENT DOCUMENTS

| | | | |
|---|---|---|---|
| 5,401,589 A | 3/1995 | Palmer et al. | |
| 5,980,726 A | 11/1999 | Moulthrop, Jr. et al. | |
| 6,033,793 A | 3/2000 | Woods et al. | |
| 6,321,145 B1 | 11/2001 | Rajashekara | |
| 6,423,896 B1 | 7/2002 | Keegan | |
| 6,455,185 B1 | 9/2002 | Bircann et al. | |
| 6,485,852 B1 | 11/2002 | Miller et al. | |
| 6,509,113 B1 | 1/2003 | Keegan | |
| 6,551,734 B1 | 4/2003 | Simpkins et al. | |
| 6,562,496 B1 | 5/2003 | Faville et al. | |
| 6,608,463 B1 | 8/2003 | Kelly et al. | |
| 6,613,468 B1 | 9/2003 | Simpkins et al. | |
| 6,613,469 B1 | 9/2003 | Keegan | |
| 6,627,339 B1 | 9/2003 | Haltiner, Jr. | |
| 6,630,264 B1 | 10/2003 | Haltiner, Jr. et al. | |
| 6,682,841 B1 * | 1/2004 | Armstrong et al. | 429/26 |

FOREIGN PATENT DOCUMENTS

EP  0692835  1/1996

* cited by examiner

*Primary Examiner*—Michael Barr
*Assistant Examiner*—Monique Wills
(74) *Attorney, Agent, or Firm*—Paul L. Marshall

(57) ABSTRACT

A method for fuel cell system thermal management includes: maintaining a first zone at a first selected temperature range, maintaining a second zone at a second selected temperature range, and maintaining a third zone at a third selected temperature range. The second zone is in thermal communication with a first sensor and comprises a reformer, while the third zone is in thermal communication with a second sensor and comprises a fuel cell stack. The second selected temperature range is greater than the first selected temperature range, while the third selected temperature range is greater than the second selected temperature range. The method may further include sensing a second zone temperature in the second zone, determining whether the second zone temperature is at the second selected temperature range, and adding a process air flow to the second zone if the second zone temperature rises above the second selected temperature range.

15 Claims, 1 Drawing Sheet

TEMPERATURE ZONES IN A SOLID OXIDE FUEL CELL AUXILIARY POWER UNIT

CROSS-REFERENCE TO RELATED APPLICATION

The present application claims the benefit of the dates of earlier filed provisional applications, having U.S. Provisional Application No. 60/201,568, filed on May 1, 2000, and U.S. Provisional Application No. 60/268,328, filed on Feb. 13, 2001, which are incorporated herein in their entirety.

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has reduced the environmental differential between optimized conventional and alternative fuel vehicle systems. However, many technical challenges remain to make the conventionally-fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, etc.) to significant toxic and $CO_2$ emission improvements (natural gas, etc.). Hydrogen has the potential to be a nearly emission free internal combustion engine fuel (including $CO_2$ if it comes from a non-fossil source).

The automotive industry has made very significant progress in reducing automotive emissions. This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, particularly solid oxide fuel cells (SOFC), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposite sides of an electrolyte. The oxidant passes over the oxygen electrode (cathode) while the fuel passes over the fuel electrode (anode), generating electricity, water, and heat.

The fuel gas for the cell can be derived from conventional liquid fuels, such as gasoline, diesel fuel, methanol, or ethanol. The device, which converts the liquid fuel to a gaseous fuel suitable for use in a fuel cell, is known as a reformer.

The long term successful operation of a fuel cell depends primarily on maintaining structural and chemical stability of fuel cell components during steady state conditions, as well as transient operating conditions such as cold startups and emergency shut downs. The support systems are required to store and control the fuel, compress and control the oxidant and provide thermal energy management.

SUMMARY

The above discussed and other drawbacks and deficiencies of the prior art are overcome or alleviated by a thermal management system. In an exemplary embodiment of the disclosure, a method of controlling temperature at an auxiliary power unit located in a vehicle includes: sensing a reformer zone temperature at a reformer zone; determining whether the reformer temperature is at a first selected temperature range; and adding a process air flow to the reformer zone if the reformer zone temperature rises above the selected temperature range.

In one embodiment, a method of producing electricity at a fuel cell in a vehicle includes: adding a fuel and a reactant to a fuel reformer; producing a reformate at the fuel reformer; introducing the reformate to a fuel cell stack; and producing electrical power at the fuel cell stack. A reformer zone temperature is sensed at a reformer zone and it is determined whether the reformer zone temperature is at a first selected temperature range. If the reformer zone temperature rises above the first selected temperature range a first process air is added to the reformer zone.

One embodiment of a method for fuel cell system thermal management, includes: maintaining a first zone at a first selected temperature range, maintaining a second zone at a second selected temperature range, and maintaining a third zone at a third selected temperature range. The second zone is in thermal communication with a first sensor and includes a reformer, while the third zone is in thermal communication with a second sensor and includes a fuel cell stack. The second selected temperature range is greater than the first selected temperature range, while the third selected temperature range is greater than the second selected temperature range.

A thermal management system for use with an auxiliary power unit includes a first air control valve in fluid communication with a first process air supply and a fuel reformer zone, the first air control valve in operable communication with a controller; a second air control valve in fluid communication with a second process air supply and a hot fuel cell zone, the second air control valve in operable communication with the controller; a reformer zone temperature sensor in thermal communication with the fuel reformer and in operable communication with the controller; a hot zone temperature sensor in thermal communication with the hot zone and in electronic communication with the controller; a first outlet at the reformer zone; and a second outlet at the hot zone.

BRIEF DESCRIPTION OF THE DRAWINGS

Referring now to the drawing, which is meant to be exemplary and not limiting.

DESCRIPTION OF A PREFERRED EMBODIMENT

Figure 1:
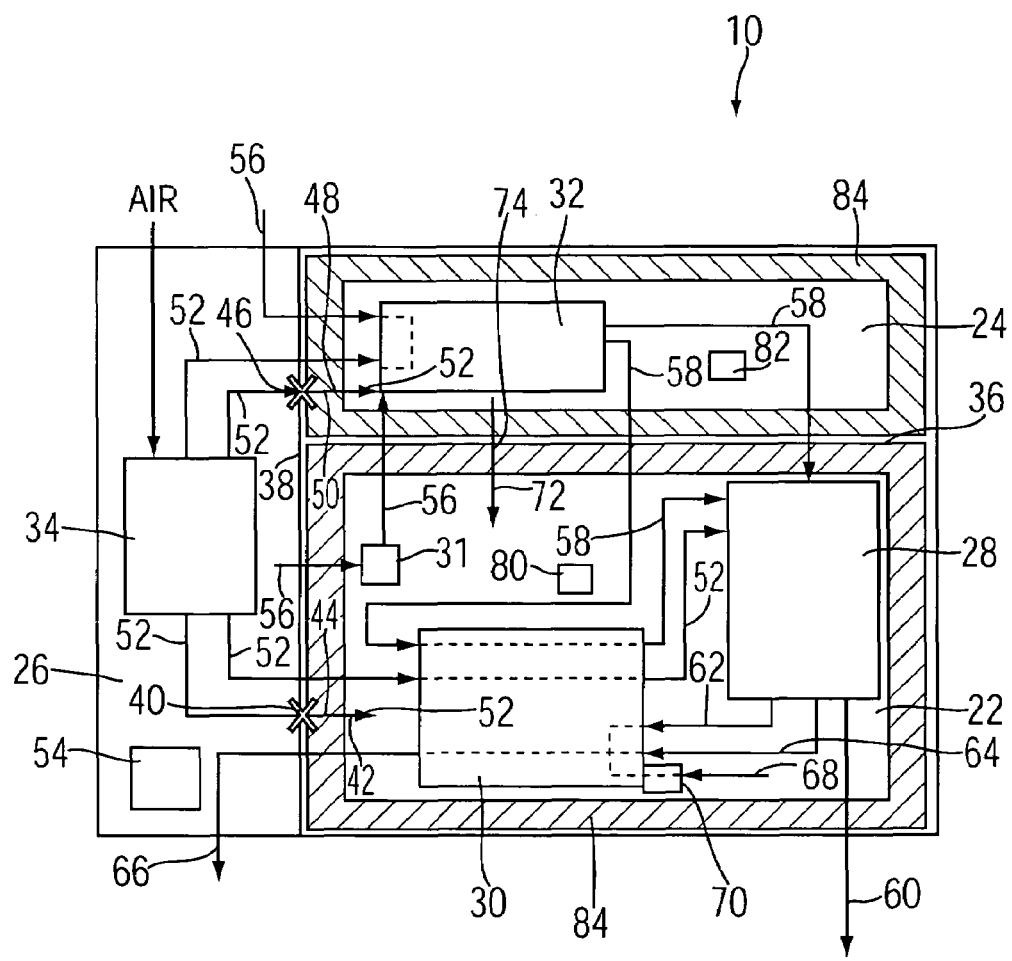
FIG. 1 is a schematic of an exemplary fuel cell system with a thermal management system.

Application of a SOFC in a transportation vehicle imposes specific temperature, volume, and mass requirements, as well as "real world" factors such as fuel infrastructure, government regulations, and cost to be a successful product. This SOFC power generation system focuses on the power output necessary to serve as an auxiliary power unit on-board and not as the prime energy source of the vehicle. This auxiliary power unit would be carried on-board the vehicle as the electrical generator to supply the electrical loads that are on-board the vehicle. The system operates at higher overall efficiency (i.e., fuel energy input to electrical energy output) than current electromechanical alternator systems in current vehicles. The efficient operation of the SOFC system also permits electrical power to be generated on-board a vehicle even when the primary internal combustion engine is not operating (which will be critical to "no-idle" emissions laws being enacted in global regions).

Referring to FIG. 1, a fuel cell auxiliary power unit 10 is schematically depicted. The auxiliary power unit 10 comprises a hot zone 22, a reformer zone 24 and an outside zone 26. Hot zone 22, which is an insulated enclosure, includes a fuel cell stack 28 and may include a waste energy recovery unit 30 and a micro-reformer 31. Hot zone 22 may reach temperatures of about 600° C. to about 800° C. once fuel cell stack 28 is operating at steady state, preferably about 725° C. to about 775° C. Reformer zone 24 is also an insulated enclosure and includes a fuel reformer 32. Waste energy recovery unit 30 and micro-reformer 31 are shown in hot zone 22, however, they could also be located in reformer zone 24. Reformer zone 24 may reach temperatures up to about 500° C. and optimally, should be about 300° C. to about 500° C. once fuel reformer 32 is operating at steady state. Outside zone 26 includes a process air supply 34, air control valves 40 and 46, sensors (not shown), and controller 54 (e.g., an electronic controller). Outside zone 26 temperature is less than about 120° C.

Hot zone 22 is separated from reformer zone 24 by a thermal wall 36 so that the operating temperature of reformer zone 24 can be kept at a cooler temperature than the operating temperature of hot zone 22. Additionally, outside zone 26 is separated from both hot zone 22 and reformer zone 24 by a thermal wall 38 so that the temperature of outside zone 26 can be kept at cooler temperatures than the operating temperature of both hot zone 22 and reformer zone 24.

Auxiliary power unit 10 operates by providing fuel reformer 32 with a fuel supply 56 and a process air flow 52, which is generated from process air supply 34. Optionally, fuel supply 56 is routed through micro-reformer 31 to fuel reformer 32. The process of reforming hydrocarbon fuels, such as gasoline, is completed to provide an immediate fuel source for rapid start up of fuel cell stack 28, as well as protecting fuel cell stack 28 by removing impurities. Fuel reforming can be used to convert a hydrocarbon (such as gasoline) or an oxygenated fuel (such as methanol) into hydrogen and byproducts (e.g., carbon monoxide, carbon dioxide, and water). Common approaches include steam reforming, partial oxidation, and dry reforming, and the like, as well as combinations comprising at least one of the foregoing approaches.

Fuel reformer 32 produces a reformate 58, which can be directed through a waste energy recovery unit 30 or directly to fuel cell stack 28. Process air flow 52 can be provided through waste energy recovery unit 30 to fuel cell stack 28. Fuel cell stack 28 uses reformate 58 to create electrical energy 60 and waste byproducts such as spent/unreacted fuel 62 and spent air 64. Thermal energy from the flow of spent/unreacted fuel 62 and spent air 64 can optionally be recovered in a waste energy recovery unit 30, which can recycle the flow of fuel and waste heat to the fuel reformer and can also discharge a flow of reaction products 66 (e.g., water and carbon dioxide) from auxiliary power unit 10. Waste energy recovery unit 30 converts unused chemical energy (reformats 58) and thermal energy (exothermic reaction heat from the fuel cell stack 28) to input thermal energy for fuel cell stack 28 through the use of an integration of catalytic combustion zones and/or heat exchangers.

Ultimately, electrical energy 60 is harnessed from fuel cell stack 28 for use by a motor vehicle (not shown). Fuel cell stack 28 produces a desired or predetermined amount of electrical power to the vehicle. Fuel cell stack 28 can be a SOFC stack having a multilayer ceramic/metal composite structure design to produce electricity 60. It can comprise one or more multi-cell modules (not shown), which produce a specific voltage that is a function of the number of cells in the module.

The thermal management system provides process air flow 52 for the fuel cell stack 28 and fuel reformer 32, and can be used to regulate the temperature in both hot zone 22 and reformer zone 24 of auxiliary power unit 10. The thermal management system includes an air control valve 40 that is in fluid communication with an inlet 42 of hot zone 22 via a pipe 44, tube, hose or other similar device that can transport air and the like. Air control valve 40 supplies a process air flow 52 to hot zone 22. Process air flow 52 may be about ambient temperature or slightly above ambient temperature. As process air flow 52 enters hot zone 22, a hot air 68 enters waste energy recovery unit 30. In the preferred embodiment, hot air 68 may enter waste energy recovery unit 30 in an area 70 that is separated from inlet 42. This allows process air flow 52 to disperse through hot zone 22 before entering waste energy recovery unit 30.

The thermal management system also includes an air control valve 46 that is in fluid communication with an inlet 48 of reformer zone 24 via a pipe 50, tube, hose or other similar device that can transport air and the like. Air control valve 46 supplies process air flow 52 to reformer zone 24. As process air flow 52 enters reformer zone 24, reformer air 72 enters hot zone 22 via a pipe 74, hose, or other similar device that can transport air and the like. There does not need to be a valve at pipe 74. Instead, reformer air 72 moves from reformer zone 24 to hot zone 22 because as process air flow 52 moves into reformer zone 24, reformer air 72 is then pushed out into hot zone 22. In addition, as process air flow 52 enters reformer zone 24, the air pressure in reformer zone 24 may be slightly higher than the air pressure in hot zone 22, and thus, reformer air 72 moves from reformer zone 24 to hot zone 22.

The thermal management system also includes a hot zone temperature sensor 80 and a reformer zone temperature sensor 82. Hot zone temperature sensor 80 is located in hot zone 22 and may be located in an area away from fuel cell stack 28. It is preferable that hot zone temperature sensor 80 not be located directly adjacent fuel cell stack 28 because fuel cell stack 28 emits very high temperatures. If hot zone temperature sensor 80 is located directly adjacent to fuel cell stack 28, a false high reading may occur. Reformer zone temperature sensor 82 is located in reformer zone 24 and may be located in an area away from fuel reformer 32. If reformer zone temperature sensor 82 is located directly adjacent to fuel reformer 32, a false high reading may occur.

As explained above, hot zone 22 and reformer zone 24 are insulated enclosures. In an exemplary embodiment, a microporous insulation 84 is employed, which is a high efficiency insulation. While a less efficient insulation may be utilized, it is preferred to use an insulation that is efficient because of the very high temperature and the limited amount of space that may be utilized for the auxiliary power unit 10.

When auxiliary power unit 10 is energized and the system is cold, e.g., about ambient temperature, various components of auxiliary power unit 10 should be heated, preferably rapidly, to bring auxiliary power unit 10 up to operating temperature. Once auxiliary power unit 10 is operating, hot zone temperature sensor 80 and reformer zone temperature sensor 82 detect the temperature in hot zone 22 and reformer zone 24, respectively.

If hot zone temperature sensor 80 detects that the temperature in hot zone 22 increases above a desired temperature, e.g., about 800° C., temperature sensor 80, which is in operable (e.g., electrical) communication with controller 54, sends a signal to controller 54. Controller 54, which is in electrical communication with air control valve 40, sends a signal to air control valve 40 to open. When air control valve 40 opens, process air flow 52 begins to flow through pipe 44 to inlet 42 and enters hot zone 22. Process air flow 52 disperses through hot zone 22. Process air flow 52 is cooler than the temperature in hot zone 22 and therefore, cools the temperature in hot zone 22.

Once the temperature in hot zone 22 begins to cool, process air flow 52 is reduced or may even be stopped. By reducing process air flow 52, the temperature in hot zone 22 begins to rise again causing process air flow 52 to then increase. Process air flow 52 increases to cool the temperature in hot zone 22 and reduces to increase the temperature in hot zone 22. As process air flow 52 enters hot zone 22, hot air 68 leaves hot zone 22 by entering waste energy recovery 30 at area 70 or other suitable entry place. By having hot air 68 exit hot zone 22, the pressure within hot zone 22 can be controlled.

In addition, if reformer zone temperature sensor 82 detects that the temperature in reformer zone 24 is increasing above about 400° C., reformer zone temperature sensor 82, which is also in electrical communication with controller 54, sends a signal to controller 54. Controller 54, which is electrical communication with air control valve 46, sends a signal to air control valve 46 to open. When air control valve 46 opens, process air flow 52 begins to flow through pipe 50 to inlet 48 and enters reformer zone 24. Process air flow 52 disperses through reformer zone 22. Process air flow 52 is cooler than the temperature in reformer zone 24 and therefore, cools the temperature in reformer zone 24. Once the temperature in reformer zone 24 begins to cool, process air flow 52 is reduced or may even be stopped. By reducing process air flow 52, the temperature in reformer zone 24 begins to rise causing process air flow 52 to then increase. Process air flow 52 increases to cool the temperature in reformer zone 24 and reduces to increase the temperature in reformer zone 24. As process air flow 52 enters reformer zone 24, reformer air 72 leaves reformer zone 24 by entering hot zone 22. By having reformer air 72 leave reformer zone 24, the pressure within reformer zone 24 can be controlled. In addition, reformer air 72 is cooler than the temperature in hot zone 22 and therefore, assists in cooling the temperature in hot zone 22.

One advantage of the thermal management system is that the temperature at hot zone 22 and reformer zone 24 can be regulated. If hot zone 22 increases above about 800° C., the fuel cell stack would run too hot. If the temperature in hot zone 22 falls below about 600° C., fuel cell stack 28 would run too cold. Thus, the thermal management system allows for increasing or decreasing an amount of cooler air that enters hot zone 22 and also allows for excess hot air 54 to enter waste energy recovery unit 30. In addition, it is desirable to maintain the operating temperature of reformer zone 24 at about 300° C. to about 500° C. If the temperature in reformer zone 24 reaches temperatures above about 500° C., the shell of fuel reformer 32 may become too hot and fuel in fuel reformer 32 will combust or coke before it reaches the reaction catalyst. If the shell becomes too cold, the fuel will not be adequately vaporized and will not react properly on the catalyst.

The thermal management system enables maintenance of different temperatures in outside zone 26, reformer zone 24 and hot zone 22. The temperature in reformer zone 24 is typically less than the temperature in hot zone 22 and the temperature in outside zone 26 is typically less than the temperature in reformer zone 24. By controlling these temperatures, the fuel cell system (which can comprise any type of fuel cell stack) operates more efficiently. Since controller 54 is typically physically disposed within outside zone 26, it does not require high temperature compatibility.

While preferred embodiments have been shown and described, various modifications and substitutions may be made thereto without departing from the spirit and scope of the invention. Accordingly, it is to be understood that the fuel reformer has been described by way of illustration only, and such illustrations and embodiments as have been disclosed herein are not to be construed as limiting to the claims.

The invention claimed is:

1. The method of producing electricity at an auxiliary power unit in a vehicle comprising:
   adding a fuel and a reactant to a fuel reformer;
   producing a reformate at said fuel reformer;
   introducing said reformate to a fuel cell stack;
   producing electrical power at said fuel cell stack;
   sensing a reformer zone temperature at a reformer zone, said fuel reformer being positioned within said reformer zone;
   determining whether said reformer zone temperature is at a first selected temperature range;
   adding a first process air flow to said reformer zone if said reformer zone temperature rises above said first selected temperature ranges;
   sensing a hot zone temperature at a hot zone, said fuel cell stack being positioned within said hot zone wherein said hot zone is distinct from said reformer zone;
   determining whether said hot zone temperature is at a second selected temperature range; and
   adding a second process air flow to said hot zone if said hot zone temperature rises above said second selected temperature range.

2. The method in claim 1, further comprising reducing said first process air flow to said reformer zone if said reformer zone temperature falls below said first selected temperature range.

3. The method in claim 1, further comprising increasing said first process air flow to said reformer zone if said reformer zone temperature increases above said first selected temperature range.

4. The method in claim 1, wherein said adding said first process air flow comprises controlling said first process air flow via a first air control valve.

5. The method in claim 1, wherein said first selected temperature range is about 300° C. to about 500° C.

6. The method in claim 1, further comprising reducing said second process air flow to said hot zone if said hot zone temperature falls below said second selected temperature range.

7. The method in claim 1, further comprising increasing said second process air flow to said hot zone if said hot zone temperature increases above said second selected temperature range.

8. The method in claim 1, wherein adding to said second process air flow comprises controlling said second process air flow via a second air control valve.

9. The method in claim 1, further comprises moving a reformer air to said hot zone.

10. The method in claim 1, further comprises moving a hot air to a waste energy recovery unit.

11. The method in claim 1, wherein said second selected temperature range is about 600° C. to about 800° C.

12. The method in claim 1, wherein said second selected temperature range is about 725° C. to about 775° C.

13. The method in claim 1, wherein at least one of said reformer zone and said hot zone are insulated enclosures.

14. The method in claim 1, wherein said hot zone is separated from said reformer zone by a thermal wall.

15. The method in claim 1, wherein said first selected temperature range is about 300° C. to about 500° C., and wherein said second selected temperature range is about 600° C. to about 800° C.

* * * * *